United States Patent
Seidel

(10) Patent No.: US 8,933,153 B2
(45) Date of Patent: Jan. 13, 2015

(54) IMPACT-MODIFIED POLYCARBONATE COMPOSITIONS FOR SIMPLIFIED PRODUCTION OF COMPONENTS OF LOW TEMPERATURE TOUGHNESS HAVING HIGH GLOSS AND MATT COMPONENT SECTIONS

(71) Applicant: Bayer Intellectual Property GmbH, Monheim (DE)

(72) Inventor: Andreas Seidel, Dormagen (DE)

(73) Assignee: Bayer Intellectual Property, Monheim (DE)

( * ) Notice: Subject to any disclaimer, the term of this patent is extended or adjusted under 35 U.S.C. 154(b) by 0 days.

(21) Appl. No.: 13/852,184

(22) Filed: Mar. 28, 2013

(65) Prior Publication Data

US 2013/0267635 A1    Oct. 10, 2013

(30) Foreign Application Priority Data

Apr. 5, 2012 (EP) .................... 12163441

(51) Int. Cl.
*C08K 5/523* (2006.01)
*C08L 69/00* (2006.01)
*C08L 55/02* (2006.01)
*C08L 51/04* (2006.01)

(52) U.S. Cl.
CPC .......... *C08L 69/00* (2013.01); *C08L 55/02* (2013.01); *C08L 51/04* (2013.01); *C08L 2205/02* (2013.01); *C08L 2205/03* (2013.01)
USPC .......... 524/127; 524/123; 524/130; 524/138; 524/140; 524/141

(58) Field of Classification Search
USPC ............ 524/123, 127, 130, 138, 140, 141
See application file for complete search history.

(56) References Cited

U.S. PATENT DOCUMENTS

| | | | |
|---|---|---|---|
| 4,677,162 A | 6/1987 | Grigo et al. | |
| 5,162,423 A | 11/1992 | Neumann et al. | |
| 5,302,663 A | 4/1994 | Eichenauer et al. | |
| 6,407,163 B1 | 6/2002 | Eichenauer | |
| 6,503,628 B1 | 1/2003 | Janarthanan et al. | |
| 7,709,573 B2 | 5/2010 | Eckel et al. | |
| 2007/0135568 A1 | 6/2007 | Eckel et al. | |
| 2011/0003918 A1* | 1/2011 | Eckel et al. | 524/127 |

FOREIGN PATENT DOCUMENTS

| | | |
|---|---|---|
| DE | 4014419 A1 | 11/1991 |
| EP | 312929 A2 | 4/1989 |
| EP | 0429957 A2 | 6/1991 |
| EP | 488930 B1 | 2/1995 |
| EP | 1141123 B1 | 4/2004 |
| EP | 1960467 A1 | 8/2008 |
| WO | 9965991 A1 | 12/1999 |
| WO | 0056816 A1 | 9/2000 |
| WO | 2007065577 A1 | 6/2007 |

OTHER PUBLICATIONS

International Search Report and Written Opinion of the International Searching Authority for International Application No. PCT/EP2013/056910 (German language), mailed on Jun. 14, 2013.

* cited by examiner

*Primary Examiner* — Peter Szekely
(74) *Attorney, Agent, or Firm* — Miles & Stockbridge P.C.

(57) ABSTRACT

The present invention relates to impact-modified polycarbonate molding compositions, the use thereof for producing shaped bodies and moldings, as well as shaped bodies and molding produced therefrom themselves. Compositions of the present invention comprise mixtures of graft polymers prepared in the emulsion polymerization process and in the bulk, solution and/or suspension polymerization process having a defined grafted particle size distribution. Compositions of the present invention, on the one hand are suitable for producing, over a wide processing window, (i.e. also at high processing temperatures), non-lacquered components having a high gloss surface, and on the other hand, are also capable of precise imaging of fine-grained or surface-etched mold surfaces. A result of this point is that components of the present invention are capable of having both high gloss and deep matte component sections that can be realized in a mold having different surface textures in a single injection molding step without further after-treatment of the surface. The molding compositions have a high heat distortion temperature and ductility at low temperatures and an excellent resistance to stress cracking under the influence of media—which is particularly important with respect to non-lacquered components.

16 Claims, No Drawings

IMPACT-MODIFIED POLYCARBONATE COMPOSITIONS FOR SIMPLIFIED PRODUCTION OF COMPONENTS OF LOW TEMPERATURE TOUGHNESS HAVING HIGH GLOSS AND MATT COMPONENT SECTIONS

CROSS REFERENCE TO RELATED APPLICATIONS

This application claims priority to European Patent Application No. 12163441.4, filed Apr. 5, 2012, the contents of which is incorporated herein by reference in its entirety.

BACKGROUND

1. Field of the Invention

The present invention relates to impact-modified polycarbonate moulding compositions comprising mixtures of graft polymers prepared in the emulsion polymerization process and in the bulk, solution or suspension polymerization process having a defined particle size distribution, which on the one hand are suitable for the production, over a wide processing window (i.e. also at high processing temperatures), of non-lacquered components having a high gloss surface and on the other hand are capable of precise imaging of fine-grained or surface-etched mould surfaces. By this means, components having both high gloss and deep matt component sections can be realized in a mould with different surface textures in a single injection moulding step without further after-treatment of the surface. The moulding compositions have a high heat distortion temperature and ductility at low temperatures and an excellent resistance to stress cracking under the influence of chemicals, which is particularly important for non-lacquered components.

The present invention also relates to the use of the polycarbonate moulding compositions according to the invention for the production of shaped bodies or mouldings which can be produced in a single production step in the injection moulding process without further surface after-treatment steps and which have both high gloss and deep matt component sections.

The present invention moreover also relates to the shaped bodies or mouldings from the compositions according to the invention which can be produced in a single production step in the injection moulding process without further surface after treatment steps and which have both high gloss and deep mat component sections.

2. Description of Related Art

Impact-modified polycarbonate compositions comprising mixtures of graft polymers of defined particle size are known from the literature.

EP 1 141 123 B1 discloses highly impact-modified thermoplastic moulding compositions comprising a graft polymer prepared in the emulsion polymerization process having a trimodal rubber particle size distribution, a graft polymer prepared in the solution, bulk or suspension polymerization process and a rubber-free copolymer of styrene and acrylonitrile, which optionally can comprise a further resin, including also aromatic polycarbonate or polyester carbonate.

EP 488 930 B1 discloses ABS moulding compositions of high toughness, sufficiently high heat distortion temperature, excellent thermoplastic processability and a low surface gloss which can be adjusted in a controlled manner, comprising a mixture of three thermoplastic co- or terpolymers of different molecular weight, a graft polymer having an average particle diameter (D50) of from 50 to 500 nm, which has preferably been prepared by emulsion polymerization, a further graft polymer having an average particle diameter (D50) of from 1,000 to 5,000 nm, which has preferably been prepared by solution or bulk polymerization, and aromatic polycarbonate.

WO 99/65991 A1 describes compositions which are suitable for galvanization and comprise polycarbonate, styrene copolymer, a first graft polymer, preferably prepared in emulsion polymerization, based on a rubber base having an average particle diameter (D50) of from 50 to 500 nm and a second graft polymer, preferably prepared in bulk, solution or suspension polymerization, based on a rubber base having an average particle diameter (D50) of from 600 to 20,000 nm.

U.S. Pat. No. 4,677,162 discloses moulding compositions of low temperature toughness and low gloss comprising polycarbonate, bulk ABS having an average particle size of greater than 750 nm and an impact-modifying graft polymer having an average rubber particle size of below 750 nm.

DE 40 14 419 A1 discloses thermoplastic moulding compositions having good flow properties, a good low temperature toughness and high heat stability comprising polycarbonate, a first graft polymer prepared in the bulk, solution or suspension process having an average particle diameter of the grafted rubber particles of from 500 to 5,000 nm and a second graft polymer prepared in the emulsion polymerization process having a graft base having an average particle diameter (D50) of from 50 to 2,000 nm.

EP 312 929 A2 describes thermoplastic moulding compositions having a good toughness, flowability, high gloss and good resistance to weathering comprising polycarbonate and a mixture of two graft polymers, wherein the first graft polymer, prepared by emulsion polymerization, is based on an elastomeric graft base having an average particle diameter (D50) of from 50 to 500 nm and the second graft polymer, prepared by bulk, solution or suspension polymerization, has an average particle diameter of from 800 to 5,000 nm.

EP 1 960 467 A1 discloses compositions of excellent low temperature ductility and improved processing properties comprising polycarbonate, two graft polymers, optionally a (co)polymer, characterized in that the weight-average molecular weight of the free (co)polymer in the first graft polymer differs from the weight-average molecular weight of the mixture of the free (co)polymer in the second graft polymer and the (co)polymer optionally added separately by at least 32,000 g/mol. In a preferred embodiment one of the two graft polymers and in a particularly preferred embodiment both graft polymers are a bulk, solution or suspension polymer.

SUMMARY

An object of the present invention was to provide polycarbonate moulding compositions which have good processing properties, a high heat distortion temperature and an excellent low temperature ductility and resistance to stress cracking under the influence of chemicals, and which, over a wide temperature processing window, on the one hand deliver high gloss surfaces using highly polished moulds and on the other hand are capable of precise imaging of fine-grained or surface-etched mould surfaces.

The compositions described in the state of the art do not fulfil this object in a satisfactory way.

It has now been found, surprisingly, that this object and others can be achieved by impact-modified polymer compositions comprising A) 45 to 95 parts by wt., preferably 50 to 80 parts by wt., in particular 55 to 75 parts by wt., based on the sum of A and B, wherein the parts by weight of A and B add up to 100, of aromatic polycarbonate and/or polyester carbonate having a weight-average molecular weight (measured by gel permeation chromatography (GPC) in methylene chloride at 25° C. using a polycarbonate standard) of from preferably 23,000 to 35,000 g/mol, particularly preferably 24,000 to 33,000 g/mol, very particularly preferably 26,000 to 31,000 g/mol, B) 5 to 55 parts by wt., preferably 20 to 50 parts by wt., in particular 25 to 45 parts by wt., based on the sum of A and B, of a mixture comprising B1) at least one graft polymer prepared in the emulsion polymerization process, B2) at least one graft polymer prepared in the bulk, suspension or solution polymerization process, B3) optionally a rubber-free vinyl (co)polymer and C) 0 to 30 parts by wt., preferably 0.1 to 20 parts by wt., in particular 0.3 to 7 parts by wt., based on the sum of A and B, of at least one commercially available polymer additive, characterized in that the composition comprises in total not more than 2.0 wt. % of grafted particles from components B1 and B2 having an associated grafted particle diameter of at least 800 nm, and comprises in total not more than 2.0 wt. % of grafted particles from components B1 and B2 having an associated grafted particle diameter of at most 100 nm, and characterized in that the graft polymer according to component B1 is prepared by grafting a mixture (B1.1) of vinylic compounds on to a particulate rubber-elastic graft base (B1.2), wherein this grafting reaction is started using an inorganic persulfate compound as a polymerization initiator, and wherein the composition is preferably free from graft polymers prepared in the emulsion polymerization process which have been prepared using redox-based polymerization initiator systems.

DETAILED DESCRIPTION OF A PREFERRED EMBODIMENT

Unless explicitly stated otherwise in the present application, the grafted particle size distribution and values derived therefrom are determined by means of ultracentrifuge measurement (W. Scholtan, H. Lange, Kolloid, Z. and Z. Polymere 250 (1972), 782-1796).

The percentage weight content of the grafted particles from B1 and B2, based on the total composition, having an associated grafted particle diameter above 800 nm (A>800 nm) or, respectively, below 100 nm (A<100 nm) is calculated from the gel contents GB1 and GB2 determined individually on components B1 and B2, the grafted particle weight contents, determined individually for components B1 and B2, having an associated grafted particle diameter above 800 nm (AB1,>800 nm and AB2,>800 nm) or, respectively, below 100 nm (AB1,<100 nm and AB2,<100 nm) and the percentage wt. contents of B1 and B2 in the total composition [B1] and [B2].

The calculation is performed according to the following formulae:

$$A_{<100\,nm} = [B1] \cdot G_{B1} \cdot A_{B1,<100\,nm} + [B2] \cdot G_{B2} \cdot A_{B2,<100\,nm}$$

and $$A_{>800\,nm} = [B1] \cdot G_{B1} \cdot A_{B1,<100\,nm} + [B2] \cdot G_{B2} \cdot A_{B2,>800\,nm}.$$

Alternatively, the percentage weight content of the grafted particles from B1 and B2, based on the sum of A to C, having an associated grafted particle diameter above 800 nm or, respectively, below 100 nm can also be determined directly on the compounded composition by ultracentrifugation on a suspension of the composition in a suitable medium, preferably in propylene carbonate. For this, the polycarbonate and polyester carbonate content of the composition can optionally be completely hydrolysed beforehand.

The graft polymer B2 is employed in the compositions according to the invention in a concentration of from preferably 2 to 90 parts by wt., particularly preferably from 5 to 65 parts by wt., very particularly preferably from 10 to 45 parts by wt., based on the sum of B1 and B2.

In a preferred embodiment, the sum of the contents of components B1 and B2, based on component B, in the compositions according to the invention is 35 to 100 parts by wt., further preferably 35 to 85 parts by wt, particularly preferably 40 to 80 parts by wt.

In a preferred embodiment, the content of the rubber-free vinyl (co)polymer according to component B3, based on component B, in the compositions according to the invention is 0 to 65 parts by wt., further preferably 15 to 65 parts by wt., particularly preferably 20 to 60 parts by wt.

In a preferred embodiment, the graft polymers B1 and B2 are both based on butadiene-containing elastomeric graft bases B1.2 and B2.2. The total content of butadiene from the graft bases B1.2 and B2.2, based on the total composition by weight, is preferably 3 to 14 wt. %, particularly preferably 5 to 12 wt. %, particularly preferably 6 to 10 wt. %.

Component A

Aromatic polycarbonates and/or aromatic polyester carbonates according to component A which are suitable according to the invention are known from the literature or can be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates e.g. DE-A 3 077 934).

Aromatic polycarbonates are prepared e.g. by reaction of diphenols with carbonic acid halides, preferably phosgene, and/or with aromatic dicarboxylic acid dihalides, preferably benzenedicarboxylic acid dihalides, by the interfacial process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is likewise possible.

Diphenols for the preparation of the aromatic polycarbonates and/or aromatic polyester carbonates are preferably those of the formula (I)

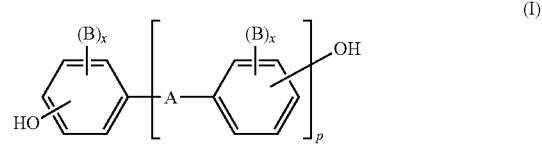

wherein

A is a single bond, C1 to C5-alkylene, C2 to C5-alkylidene, C5 to C6-cycloalkylidene, —O—, —SO—, —CO—, —S—, —SO$_2$—, C6 to C12-arylene, on to which further aromatic rings optionally comprising hetero atoms can be fused, or a radical of the formula (II) or (III)

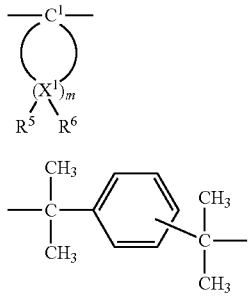

(II)

(III)

B is in each case C1 to C12-alkyl, preferably methyl, halogen, preferably chlorine and/or bromine, x is in each case independently of each other 0, 1 or 2, p is 1 or 0, and R5 and R6 can be chosen individually for each X1 and independently of each other denote hydrogen or C1 to C6-alkyl, preferably hydrogen, methyl or ethyl, X1 denotes carbon and m denotes an integer from 4 to 7, preferably 4 or 5, with the proviso that on at least one atom X1 R5 and R6 are simultaneously alkyl.

Preferred diphenols are hydroquinone, resorcinol, dihydroxydiphenols, bis-(hydroxyphenyl)-C1-C5-alkanes, bis-(hydroxyphenyl)-C5-C6-cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl)-diisopropylbenzenes and derivatives thereof brominated on the nucleus and/or chlorinated on the nucleus.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or -hyphen chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The diphenols can be employed individually or as any desired mixtures. The diphenols are known from the literature or obtainable by processes known from the literature.

Chain terminators which are suitable for the preparation of the thermoplastic, aromatic polycarbonates are, for example, phenol, p-chlorophenol, p-tert-butylphenol or 2,4,6-tribromophenol, but also long-chain alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethyl-heptyl)-phenol and 4-(3,5-dimethylheptyl)-phenol. The amount of chain terminators to be employed is in general between 0.5 mol % and 10 mol %, based on the sum of the moles of the particular diphenols employed.

The thermoplastic, aromatic polycarbonates preferably have average weight-average molecular weights (Mw, measured by gel permeation chromatography in methylene chloride at 25° C. with polycarbonate as the standard) of from 23,000 to 35,000 g/mol, preferably 24,000 to 33,000 g/mol, particularly preferably 26,000 to 31,000 g/mol.

The thermoplastic, aromatic polycarbonates can be branched in a known manner, and in particular preferably by incorporation of from 0.05 to 2.0 mol %, based on the sum of the diphenols employed, of compounds which are trifunctional or more than trifunctional, for example those having three and more phenolic groups.

Both homopolycarbonates and copolycarbonates are suitable. 1 to 25 wt. %, preferably 2.5 to 25 wt. %, based on the total amount of diphenols to be employed, of polydiorganosiloxanes having hydroxyaryloxy end groups can also be employed for the preparation of copolycarbonates according to the invention according to component A. These are known (U.S. Pat. No. 3,419,634) and can be prepared by processes known from the literature. The preparation of copolycarbonates containing polydiorganosiloxane is described in DE-A 3 334 782.

Preferred polycarbonates are, in addition to the bisphenol A homopolycarbonates, the copolycarbonates of bisphenol A with up to 15 mol %, based on the sum of the moles of diphenols, of other diphenols mentioned as preferred or particularly preferred, in particular 2,2-bis-(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and of naphthalene-2,6-dicarboxylic acid.

Mixtures of the diacid dichlorides of isophthalic acid and of terephthalic acid in a ratio of between 1:20 and 20:1 are particularly preferred.

A carbonic acid halide, preferably phosgene, is additionally co-used as a bifunctional acid derivative in the preparation of polyester carbonates.

Possible chain terminators for the preparation of the aromatic polyester carbonates are, in addition to the monophenols already mentioned, also chlorocarbonic acid esters thereof and the acid chlorides of aromatic monocarboxylic acids, which can optionally be substituted by C1 to C22-alkyl groups or by halogen atoms, and aliphatic C2 to C22-monocarboxylic acid chlorides.

The amount of chain terminators is in each case 0.1 to 10 mol %, based on the moles of diphenol in the case of the phenolic chain terminators and on the moles of dicarboxylic acid dichloride in the case of monocarboxylic acid chloride chain terminators.

The aromatic polyester carbonates can also comprise incorporated aromatic hydroxycarboxylic acids.

The aromatic polyester carbonates can be either linear or branched in a known manner (in this context see DE-A 2 940 024 and DE-A 3 007 934).

Branching agents which can be used are, for example, carboxylic acid chlorides which are trifunctional or more than trifunctional, such as trimesic acid trichloride, cyanuric acid trichloride, 3,3',4,4'-benzophenonetetracarboxylic acid tetrachloride, 1,4,5,8-naphthalenetetracarboxylic acid tetrachloride or pyromellitic acid tetrachloride, in amounts of from 0.01 to 1.0 mol-% (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenylisopropyl)-phenol, tetra-(4-hydroxyphenyl)- methane, 2,6-bis(2-hydroxy-5-methylbenzyl)-4-methylphenol, 2-(4-hydroxyphenyl)-2-(2,4-dihydroxyphenyl)-propane, tetra-(4-[4-hydroxyphenylisopropyl]-phenoxy)-methane, 1,4-bis[4,4'-dihydroxytriphenyl)-methyl]-benzene, in amounts of from 0.01 to 1.0 mol %, based on the diphenols employed. Phenolic branching agents can be initially introduced with the diphenols, and acid chloride branching agents can be introduced together with the acid dichlorides.

The content of carbonate structural units in the thermoplastic, aromatic polyester carbonates can vary as desired. Preferably, the content of carbonate groups is up to 100 mol %, in particular up to 80 mol %, particularly preferably up to 50 mol %, based on the sum of ester groups and carbonate groups. Both the ester and the carbonate content of the aromatic polyester carbonates can be present in the polycondensate in the form of blocks or in random distribution.

The thermoplastic, aromatic polycarbonates and polyester carbonates can be employed by themselves or in any desired mixture.

Component B1

Component B1 is graft polymers, prepared in the emulsion polymerization process, of, in a preferred embodiment, B1.1) 5 to 95 wt. %, preferably 10 to 70 wt. %, particularly preferably 20 to 60 wt. %, based on component B1, of a mixture of B1.1.1) 65 to 85 wt. %, preferably 70 to 80 wt. %, based on B1.1, of at least one monomer chosen from the group of vinylaromatics (such as, for example, styrene, α-methylstyrene), vinylaromatics substituted on the nucleus (such as, for example, p-methylstyrene, p-chlorostyrene) and methacrylic acid (C1-C8)-alkyl esters (such as, for example, methyl methacrylate, ethyl methacrylate) and B1.1.2) 15 to 35 wt. %, preferably 20 to 30 wt. %, based on B1.1, of at least one monomer chosen from the group of vinyl cyanides (such as, for example, unsaturated nitriles, such as acrylonitrile and methacrylonitrile), (meth)acrylic acid (C1-C8)-alkyl esters (such as, for example, methyl methacrylate, n-butyl acrylate, tert-butyl acrylate) and derivatives (such as, for example, anhydrides and imides) of unsaturated carboxylic acids (for example maleic anhydride and N-phenylmaleimide)

on

B1.2) 95 to 5 wt. %, preferably 90 to 30 wt. %, particularly preferably 80 to 40 wt. %, based on component B1, of at least one elastomeric graft base.

The graft base preferably has a glass transition temperature of <0° C., further preferably <−20° C., particularly preferably <−60° C.

Unless stated otherwise in the present invention, glass transition temperatures are determined by means of dynamic differential calorimetry (DSC) in accordance with the standard DIN EN 61006 at a heating rate of 10 K/min with definition of the Tg as the midpoint temperature (tangent method) and nitrogen as the inert gas.

The grafted particles in component B1 preferably have an average particle size (D50 value) of from 0.1 to 0.8 μm, preferably from 0.15 to 0.6 μm, particularly preferably from 0.2 to 0.5 μm.

The average particle size D50 is the diameter above and below which in each case 50 wt. % of the particles lie.

In a preferred embodiment, the emulsion graft polymer according to component B1 comprises less than 15 wt. %, particularly preferably less than 10 wt. %, very particularly preferably less than 5 wt. %, based on the gel content of the polymer, of grafted particles having a particle diameter of above 800 nm, and in a further preferred embodiment less than 30 wt. %, particularly preferably less than 20 wt. %, in particular less than 15 wt. %, based on the gel content of the polymer, of grafted particles having a diameter of below 100 nm.

Preferred monomers B1.1.1 are chosen from at least one of the monomers styrene, α-methylstyrene and methyl methacrylate, and preferred monomers B1.1.2 are chosen from at least one of the monomers acrylonitrile, maleic anhydride and methyl methacrylate.

Particularly preferred monomers are B1.1.1 styrene and B1.1.2 acrylonitrile.

Graft bases B1.2 which are suitable for the graft polymers B1 are, for example, diene rubbers, diene/vinyl block copolymer rubbers, EP(D)M rubbers, that is to say those based on ethylene/propylene and optionally diene, and acrylate, polyurethane, silicone, chloroprene and ethylene/vinyl acetate rubbers and mixtures of such rubbers, and silicone/acrylate composite rubbers in which the silicone and the acrylate components are linked to one another chemically (e.g. by grafting).

Preferred graft bases B1.2 are diene rubbers (e.g. based on butadiene or isoprene), diene/vinyl block copolymer rubbers (e.g. based on butadiene blocks and styrene blocks), copolymers of diene rubbers with further copolymerizable monomers (e.g. according to B1.1.1 and B1.1.2) and mixtures of the abovementioned rubber types. Pure polybutadiene rubber and styrene/butadiene block copolymer rubber are particularly preferred.

In a particularly preferred embodiment, the emulsion graft polymer according to component B1 is based on a rubber base B1.2 which is not prepared by agglomeration.

Furthermore preferably, the polycarbonate compositions according to the invention are free from emulsion graft polymers comprising rubber bases prepared by agglomeration.

The gel content of the graft polymers is at least 15 wt. %, preferably at least 60 wt. %, particularly preferably at least 75 wt. % (measured in acetone).

Unless stated otherwise in the present invention, the gel content of the graft polymers is determined at 25° C. as the content insoluble in acetone as the solvent (M. Hoffmann, H. Kromer, R. Kuhn, Polymeranalytik I and II, Georg Thieme-Verlag, Stuttgart 1977).

The graft polymers B1 are prepared by free radical polymerization, it being essential in the context of the present invention that the free radical grafting reaction is started using a peroxosulfate, such as, for example and preferably, sodium or potassium peroxodisulfate, as the agent which forms free radicals.

Due to the preparation, the graft polymer B1 in general comprises free, i.e. not bonded chemically to the rubber base, copolymer of B1.1.1 and B1.1.2 which is soluble in suitable solvents (e.g. acetone).

Preferably, component B1 comprises a free copolymer of B1.1.1 and B1.1.2 which has a weight-average molecular weight (Mw), determined by gel permeation chromatography with polystyrene as the standard, of from preferably 30,000 to 150,000 g/mol, particularly preferably from 40,000 to 120,000 g/mol.

Component B2

Component B2 is graft polymers, prepared in the bulk, solution or suspension polymerization process, of, in a preferred embodiment, B2.1) 5 to 95 wt. %, preferably 80 to 93 wt. %, particularly preferably 85 to 92 wt. %, very particularly preferably 87 to 93 wt. %, based on component B2, of a mixture of B2.1.1) 65 to 85 wt. %, preferably 70 to 80 wt. %, based on the mixture B.2.1, of at least one monomer chosen from the group of vinylaromatics (such as, for example, styrene, α-methylstyrene), vinylaromatics substituted on the nucleus (such as, for example, p-methylstyrene, p-chlorostyrene) and methacrylic acid (C1-C8)-alkyl esters (such as, for example, methyl methacrylate, ethyl methacrylate) and B2.1.2) 15 to 35 wt. %, preferably 20 to 30 wt. %, based on the mixture B2.1, of at least one monomer chosen from the group of vinyl cyanides (such as, for example, unsaturated nitriles, such as acrylonitrile and methacrylonitrile), (meth)acrylic acid (C1-C8)-alkyl esters (such as, for example, methyl methacrylate, n-butyl acrylate, tert-butyl acrylate) and derivatives (such as, for example, anhydrides and imides) of unsaturated carboxylic acids (for example maleic anhydride and N-phenylmaleimide)
on B2.2) 95 to 5 wt. %, preferably 20 to 7 wt. %, particularly preferably 15 to 8 wt. %, very particularly preferably 13 to 7 wt. %, based on component B2, of at least one graft base.

The graft base preferably has a glass transition temperature of <0° C., preferably <−20° C., particularly preferably <−60° C.

The grafted particles in component B2 preferably have an average particle size (D50 value) of from 0.1 to 0.75 µm, preferably from 0.2 to 0.7 µm, particularly preferably from 0.3 to 0.6 µm.

In a preferred embodiment, the graft polymer according to component B2 comprises less than 40 wt. %, particularly preferably less than 30 wt. %, in particular less than 20 wt. %, based on the gel content of the graft polymer, of grafted particles having a particle diameter of above 800 nm, and in a particularly preferred embodiment less than 10 wt. %, very particularly preferably less than 2 wt. %, based on the gel content of the graft polymer, of grafted particles having a particle diameter of below 100 nm.

Preferred monomers B2.1.1 are chosen from at least one of the monomers styrene, α-methylstyrene and methyl methacrylate, and preferred monomers B2.1.2 are chosen from at least one of the monomers acrylonitrile, maleic anhydride and methyl methacrylate.

Particularly preferred monomers are B2.1.1 styrene and B2.1.2 acrylonitrile.

Graft bases B2.2 which are suitable for the graft polymers B2 are, for example, diene rubbers, diene/vinyl block copolymer rubbers, EP(D)M rubbers, that is to say those based on ethylene/propylene and optionally diene, and acrylate, polyurethane, silicone, chloroprene and ethylene/vinyl acetate rubbers and mixtures of such rubbers, and silicone/acrylate composite rubbers in which the silicone and the acrylate components are linked to one another chemically (e.g. by grafting).

Preferred graft bases B2.2 are diene rubbers (e.g. based on butadiene or isoprene), diene/vinyl block copolymer rubbers (e.g. based on butadiene blocks and styrene blocks), copolymers of diene rubbers with further copolymerizable monomers (e.g. according to B2.1.1 and B2.1.2) and mixtures of the abovementioned rubber types. Styrene/butadiene block copolymer rubbers and mixtures of styrene/butadiene block copolymer rubbers with pure polybutadiene rubber are particularly preferred as graft base B2.2.

The gel content of the graft polymers B2 is preferably 10 to 35 wt. %, particularly preferably 15 to 30 wt. %, very particularly preferably 17 to 23 wt. % (measured in acetone).

Particularly preferred polymers B2 are e.g. ABS polymers prepared by free radical polymerization which, in a preferred embodiment, comprise up to 10 wt. %, particularly preferably up to 5 wt. %, particularly preferably 2 to 5 wt. %, in each case based on the graft polymer B2, of n-butyl acrylate.

Due to the preparation, the graft polymer B2 in general comprises free, i.e. not bonded chemically to the rubber base, copolymer of B2.1.1 and B2.1.2 which is distinguished in that it can be dissolved in suitable solvents (e.g. acetone).

Preferably, component B2 comprises a free copolymer of B2.1.1 and B2.1.2 which has a weight-average molecular weight (Mw), determined by gel permeation chromatography with polystyrene as the standard, of from preferably 50,000 to 150,000 g/mol, particularly preferably from 70,000 to 130,000 g/mol, particularly preferably from 80,000 to 120,000 g/mol.

Component B3

The composition can comprise as a further component B3 (co)polymers of at least one monomer from the group of vinylaromatics, vinyl cyanides (unsaturated nitriles), (meth)acrylic acid (C1 to C8)-alkyl esters, unsaturated carboxylic acids and derivatives (such as anhydrides and imides) of unsaturated carboxylic acids.

(Co)polymers which are suitable in particular as component B3 are those of

B3.1 50 to 99 wt. %, preferably 65 to 85 wt. %, particularly preferably 70 to 80 wt. %, based on the (co)polymer B3, of at least one monomer chosen from the group of vinylaromatics (such as, for example, styrene, α-methylstyrene), vinylaromatics substituted on the nucleus (such as, for example, p-methylstyrene, p-chlorostyrene) and (meth)acrylic acid (C1-C8)-alkyl esters (such as, for example, methyl methacrylate, n-butyl acrylate, tert-butyl acrylate) and B3.2 1 to 50 wt. %, preferably 15 to 35 wt. %, particularly preferably 20 to 30 wt. %, based on the (co)polymer B3, of at least one monomer chosen from the group of vinyl cyanides (such as, for example, unsaturated nitriles, such as acrylonitrile and methacrylonitrile), (meth)acrylic acid (C1-C8)-alkyl esters (such as, for example, methyl methacrylate, n-butyl acrylate and tert-butyl acrylate), unsaturated carboxylic acids and derivatives of unsaturated carboxylic acids (for example maleic anhydride and N-phenylmaleimide).

These (co)polymers B3 are resinous, thermoplastic and rubber-free. The copolymer of B3.1 styrene and B3.2 acrylonitrile is particularly preferred.

Such (co)polymers B3 are known and can be prepared by free radical polymerization, in particular by emulsion, suspension, solution or bulk polymerization.

The (co)polymers B3 have a weight-average molecular weight (Mw), determined by gel permeation chromatography with polystyrene as the standard, of from preferably 50,000 to 150,000 g/mol, particularly preferably from 70,000 to 130,000 g/mol, particularly preferably from 80,000 to 120,000 g/mol.

Component C

The composition can comprise commercially available polymer additives as component C.

Possible commercially available polymer additives according to component C are additives such as, for example, flameproofing agents (for example phosphorus compounds or halogen compounds), flameproofing synergists (for example nanoscale metal oxides), smoke-suppressing additives (for example boric acid or borates), antidripping agents (for example compounds from the substance classes of fluorinated polyolefins, of silicones and aramid fibres), internal and external lubricants and mould release agents (for example pentaerythritol tetrastearate, montan wax or polyethylene wax), flowability auxiliary agents (for example low molecular weight vinyl (co)polymers), antistatics (for example block copolymers of ethylene oxide and propylene oxide, other polyethers or polyhydroxy ethers, polyether amides, polyester amides or sulfonic acid salts), conductivity additives (for example conductive carbon black or carbon nanotubes), stabilizers (for example UV/light stabilizers, heat stabilizers, antioxidants, transesterification inhibitors, agents which prevent hydrolysis), antibacterially acting additives (for example silver or silver salts), additives which improve scratch resistance (for example silicone oils or hard fillers, such as ceramic (hollow) spheres or quartz powder), IR absorbents, optical brighteners, fluorescent additives, fillers and reinforcing substances (e.g. talc, ground glass or carbon fibres, glass or ceramic (hollow) spheres, mica, kaolin, CaCO3 and glass flakes), acids and dyestuffs and pigments (for example carbon black, titanium dioxide or iron oxide), or mixtures of several of the additives mentioned.

In a preferred embodiment, the compositions according to the invention comprise as component C at least one component chosen from the group of mould release agents, stabilizers and pigments. In a particularly preferred embodiment, pentaerythritol is employed as a mould release agent. In a particularly preferred embodiment, at least one compound chosen from the group of sterically hindered phenols, organic phosphites and Brønstedt acid compounds is employed as a stabilizer. In a particularly preferred embodiment, carbon black is employed as a pigment.

The compositions according to the invention can comprise as component C, in particular, also flameproofing agents, for example halogenated organic compounds or phosphorus-containing flameproofing agents. The latter are preferably employed.

Phosphorus-containing flameproofing agents in the context according to the invention are preferably chosen from the groups of mono- and oligomeric phosphoric and phosphonic acid esters, phosphonatamines and phosphazenes, it also being possible to employ mixtures of several compounds chosen from one or various of these groups as the flameproofing agent. Other halogen-free phosphorus compounds not mentioned specifically here can also be employed by themselves or in any desired combination with other halogen-free phosphorus compounds.

Preferred mono- and oligomeric phosphoric or phosphonic acid esters are phosphorus compounds of the general formula (IV)

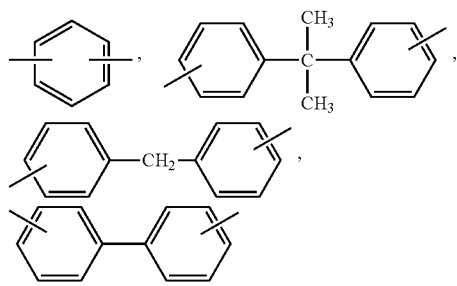

wherein
R1, R2, R3 and R4 independently of each other denote in each case optionally halogenated C1 to C8-alkyl, or C5 to C6-cycloalkyl, C6 to C20-aryl or C7 to C12-aralkyl in each case optionally substituted by alkyl, preferably C1 to C4-alkyl, and/or halogen, preferably chlorine, bromine,
n independently of each other denote 0 or 1,
q denotes 0 to 30 and
X denotes a mono- or polynuclear aromatic radical having 6 to 30 C atoms, or a linear or branched aliphatic radical having 2 to 30 C atoms, which can be substituted by OH and can comprise up to 8 ether bonds.

Preferably, R1, R2, R3 and R4 independently of each another represent C1 to C4-alkyl, phenyl, naphthyl or phenyl-C1-C4-alkyl. The aromatic groups R1, R2, R3 and R4 can in their turn be substituted by halogen groups and/or alkyl groups, preferably chorine, bromine and/or C1 to C4-alkyl. Particularly preferred aryl radicals are cresyl, phenyl, xylenyl, propylphenyl or butylphenyl and the corresponding brominated and chlorinated derivatives thereof.

X in the formula (IV) preferably denotes a mono- or polynuclear aromatic radical having 6 to 30 C atoms. This is preferably derived from diphenols of the formula (I).

n in the formula (IV) can be, independently of one another, 0 or 1, and preferably n is 1.

q represents values from 0 to 30. If mixtures of various components of the formula (IV) are employed, mixtures of preferably number-average q values of from 0.3 to 10, particularly preferably 0.5 to 10, in particular 1.05 to 1.4 can be used.

X particularly preferably represents

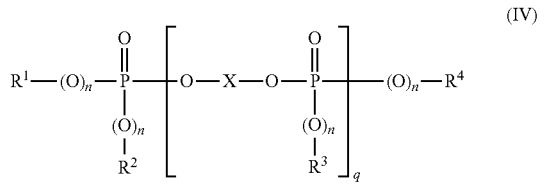

or chlorinated or brominated derivatives thereof, and in particular X is derived from resorcinol, hydroquinone, bisphenol A or diphenylphenol. Particularly preferably, X is derived from bisphenol A.

The use of oligomeric phosphoric acid esters of the formula (IV) which are derived from bisphenol A is particularly advantageous, since the compositions treated with this phosphorus compound have a particularly high resistance to stress cracking and hydrolysis and a particularly low tendency towards formation of deposits during injection moulding processing. A particularly high heat distortion temperature can furthermore be achieved with these flameproofing agents.

Monophosphates (q=0), oligophosphates (q=1-30) or mixtures of mono- and oligophosphates can be employed as component C according to the invention.

Monophosphorus compounds of the formula (IV) are, in particular, tributyl phosphate, tris-(2-chloroethyl) phosphate, tris-(2,3-dibromopropyl) phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, halogen-substituted aryl phosphates, methylphosphonic acid dimethyl ester, methylphosphenic acid diphenyl ester, phenylphosphonic acid diethyl ester, triphenylphosphine oxide or tricresylphosphine oxide.

The phosphorus compounds according to formula (IV) are known (cf. e.g. EP-A 363 608, EP-A 640 655) or can be prepared by known methods in an analogous manner (e.g. Ullmanns Enzyklopädie der technischen Chemie, vol. 18, p. 301 et seq. 1979; Houben-Weyl, Methoden der organischen Chemie, vol. 12/1, p. 43; Beilstein vol. 6, p. 177).

The average q values can be determined by determining the composition of the phosphate mixture (molecular weight distribution) by means of a suitable method (gas chromatography (GC), high pressure liquid chromatography (HPLC), gel permeation chromatography (GPC)) and calculating the mean values for q therefrom.

Phosphonatamines are preferably compounds of the formula (V)

$$A3\text{-}y\text{-}NB1y \qquad (V)$$

in which
A represents a radical of the formula (Va)

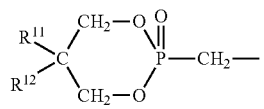

or (Vb)

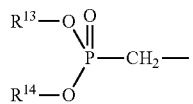

$R^{11}$ and $R^{12}$ independently of each other represent unsubstituted or substituted C1-C10-alkyl or unsubstituted or substituted C6 to C10-aryl, $R^{13}$ and $R^{14}$ independently of each other represent unsubstituted or substituted C1 to C10-alkyl or unsubstituted or substituted C6 to C10-aryl or R13 and R14 together represent unsubstituted or substituted C3 to C10-alkylene, y denotes the numerical values 0, 1 or 2 and B1 independently represents hydrogen, optionally halogenated C2 to C8-alkyl, unsubstituted or substituted C6 to C10-aryl.

B1 preferably independently represents hydrogen, ethyl, n- or iso-propyl, which can be substituted by halogen, or C6 to C10-aryl, in particular phenyl or naphthyl, which is unsubstituted or substituted by C1 to C4-alkyl and/or halogen.

Alkyl in R11, R12, R13 and R14 independently preferably represents methyl, ethyl, n-propyl, iso-propyl, n-, iso-, sec- or tert-butyl, pentyl or hexyl.

Substituted alkyl in R11, R12, R13 and R14 independently preferably represents C1 to C10-alkyl substituted by halogen, in particular mono- or disubstituted methyl, ethyl, n-propyl, iso-propyl, n-, iso-, sec- or tert-butyl, pentyl or hexyl.

C6 to C10-aryl in R11, R12, R13 and R14 independently preferably represents phenyl, naphthyl or binaphthyl, in particular o-phenyl, o-naphthyl, o-binaphthyl, which can be substituted (in general mono-, di- or trisubstituted) by halogen.

R13 and R14, together with the oxygen atoms to which they are directly bonded and the phosphorus atom, can form a ring structure.

There are mentioned by way of example and preferably: 5,5,5',5',5'',5''-hexamethyltris(1,3,2-dioxaphosphorinane-methane)amino-2,2',2''-trioxide of the formula (Va-1)

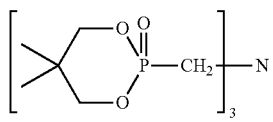

1,3,2-dioxaphosphorinane-2-methanamine, N-butyl-N[(5,5-dimethyl-1,3,2-dioxaphosphorinan-2-yl)methyl]-5,5-dimethyl-, P,2-dioxide; 1,3,2-dioxaphosphorinane-2-methanamine, N-[[5,5-dimethyl-1,3,2-dioxaphosphorinan-2-yl)methyl]-5,5-dimethyl-N-phenyl-, P,2-dioxide; 1,3,2-dioxaphosphorinane-2-methanamine, N,N-dibutyl-5,5-dimethyl-, 2-oxide, 1,3,2-dioxaphosphorinane-2-methanimine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methanamine, N-butyl-N-[(5,5-dichloromethyl-1,3,2-dioxaphosphorinan-2-yl)-methyl]-5,5-dichloromethyl-, P,2-dioxide, 1,3,2-dioxaphosphorinane-2-methanamine, N-[(5,5-dichloromethyl-1,3,2-dioxaphosphorinan-2-yl)methyl]-5,5-dichloromethyl-N-phenyl-, P,2-dioxide; 1,3,2-dioxaphosphorinane-2-methanamine, N,N-di-(4-chlorobutyl)-5,5-dimethyl-2-oxide; 1,3,2-dioxaphosphorinane-2-methanimine, N-[(5,5-dimethyl-1,3,2-dioxaphosphorinan-2-yl)methane]-N-(2-chloroethyl)-5,5-di(chloromethyl)-, P,2-dioxide.

The following are furthermore preferred:
Compounds of the formula (Va-2) or (Va-3)

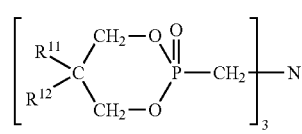

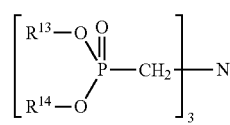

wherein
wherein $R^{11}$, $R^{12}$, $R^{13}$ and $R^{14}$ have the abovementioned meanings.

Compounds of the formula (Va-2) and (Va-1) are particularly preferred. The preparation of the phosphonatamines is described, for example, in U.S. Pat. No. 5,844,028.

Phosphazenes are compounds of the formulae (VIa) and (VIb)

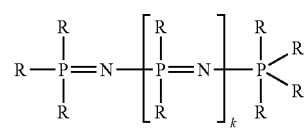

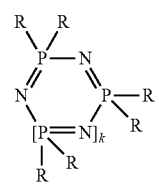

wherein

R is in each case identical or different and represents amino, in each case optionally halogenated, preferably halogenated with fluorine, C1 to C8-alkyl, or C1 to C8-alkoxy, or C5 to C6-cycloalkyl, C6 to C20-aryl, preferably phenyl or naphthyl, C6 to C20-aryloxy, preferably phenoxy, naphthyloxy, or C7 to C12-aralkyl, preferably phenyl-C1-C4-alkyl, in each case optionally substituted by alkyl, preferably C1 to C4-alkyl, and/or halogen, preferably chlorine and/or bromine, k represents 0 or a number from 1 to 15, preferably a number from 1 to 10.

There may be mentioned by way of example propoxyphosphazenei, phenoxyphosphazene, methylphenoxyphosphazene, aminophosphazene and fluoroalkylphosphazenes. Phenoxyphosphazene is preferred.

The phosphazenes can be employed by themselves or as a mixture. The radical R can always be the same or 2 or more radicals in the formulae (VIa) and (VIb) can be different. Phosphazenes and the preparation thereof are described, for example, in EP-A 728 811, DE-A 1 961668 and WO 97/40092.

The flameproofing agents can be employed by themselves or in any desired mixture with one another or in a mixture with other flameproofing agents.

Flameproofed compositions in a preferred embodiment moreover comprise the abovementioned flameproofing agents in combination with at least one antidripping agent chosen from the substance classes of fluorinated polyolefins, silicones and aramid fibres. Particularly preferably, polytetrafluoroethylene polymers are employed as antidripping agents.

Preparation of the Moulding Compositions and Shaped Articles

The thermoplastic moulding compositions according to the invention are prepared by mixing the particular constituents in a known manner and subjecting the mixture to melt compounding and melt extrusion at temperatures of from 200° C. to 340° C., preferably from 240 to 320° C., particularly preferably from 260 to 300° C., in conventional units, such as internal kneaders, extruders and twin-screw extruders.

The mixing of the individual constituents can be carried out in a known manner either successively or simultaneously, and in particular either at about 20° C. (room temperature) or at a higher temperature.

In a preferred embodiment, in a first step component B1 or a part amount of component B1 is first reacted with component B3 or a part amount of component B3 to form a precompound, and in a second step the composition according to the invention is produced using the precompound prepared in this way.

In a particularly preferred embodiment, in the first step the graft polymer B1 or a part amount of component B1 is prepared with component B3 or a part amount of component B3 by means of compounding with vacuum devolatilization, to give a low-emission precompound. It is particularly advantageous to employ component B1 in the moist state (i.e. in the presence of water) in this devolatilizing compounding. Such processes are described, for example, in EP 0 768 157 A1 and EP 0 867 463 A1. Precompounds in which the total content of volatile organic compounds is less than 1,000 mg/kg, preferably less than 800 mg/kg, in particular less than 500 mg/kg are particularly suitable. In the second process step the remaining constituents and the precompound are mixed in a known manner and the mixture is subjected to melt compounding or melt extrusion at the abovementioned temperatures in conventional units, such as internal kneaders, extruders and twin-screw extruders. In a preferred embodiment, in this second compounding step a pressure of <500 mbar, preferably <400 mbar, in particular <200 mbar (absolute) is applied for the purpose of further devolatilization of volatile constituents (such as e.g. residual monomers and residual solvent).

The invention therefore also provides a process for the preparation of low-emission compositions according to the invention.

The moulding compositions according to the invention can be used for the production of all types of shaped bodies. These can be produced by injection moulding, extrusion and blow moulding processes. A further form of processing is the production of shaped bodies by thermoforming from previously produced sheets or films.

Examples of such shaped bodies are films, profiles, housing components of all types, e.g. for domestic appliances, such as juice presses, coffee machines, mixers; for office machines, such as monitors, flat screens, notebooks, printers, copiers; sheets, tubes, electrical installation conduits, windows, doors and further profiles for the building sector (interior finishing and exterior uses) and electrical and electronic components, such as switches, plugs and sockets, and vehicle body or interior components for utility vehicles, in particular for the automobile sector.

The moulding compositions according to the invention can also be used in particular, for example, for the production of the following shaped bodies or mouldings: interior finishing components for rail vehicles, ships, aircraft, buses and other motor vehicles, housing of electrical equipment comprising small transformers, housing for equipment for processing and transmission of information, housing and lining of medical equipment, massage equipment and housing therefor, toy vehicles for children, planar wall elements, housing for safety equipment, thermally insulated transportation containers, mouldings for sanitary and bath fittings, cover grids for ventilator openings and housing for garden equipment.

The compositions according to the invention are also particularly suitable for the inexpensive production of those abovementioned shaped bodies or mouldings which can be produced in a single production step in the injection moulding process without further surface after-treatment steps and have both high gloss and deep matt component sections.

In the context of the present invention, "high gloss" is understood as meaning a gloss determined in reflection in accordance with DIN 67530 at a measuring angle of 60° of at least 98, preferably of at least 99, or at a measuring angle of 20° of at least 95. In the context of the present invention, "deep matt" is understood as meaning a gloss determined in reflection in accordance with DIN 67530 at a measuring angle of 60° of not more than 2.5, preferably not more than 2, particularly preferably not more than 1.2.

The invention thus also provides shaped bodies or mouldings from the compositions according to the invention which can be produced in a single production step in the injection moulding process without further surface after-treatment steps and have both high gloss and deep matt component sections.

Component A1

Linear polycarbonate based on bisphenol A having a weight-average molecular weight $M_w$ of 21 kg/mol (determined by GPC in methylene chloride at 25° C. with polycarbonate as the standard).

Component A3

Linear polycarbonate based on bisphenol A having a weight-average molecular weight $M_w$ of 30 kg/mol (determined by GPC in methylene chloride at 25° C. with polycarbonate as the standard).

Component A4

Linear polycarbonate based on bisphenol A having a weight-average molecular weight $M_w$ of 36 kg/mol (determined by GPC in methylene chloride at 25° C. with polycarbonate as the standard).

Component B1-1

Graft polymer of the ABS type prepared in the emulsion polymerization process with potassium peroxodisulfate (KPS) as the initiator of the free radical grafting reaction, having an A:B:S ratio of 14:49:37 wt. %, in which 6 wt. % of the grafted particles have a grafted particle diameter, determined by ultracentrifugation, of less than 100 nm and 0 wt. % of the grafted particles have a grafted particle diameter, determined by ultracentrifugation, of greater than 800 nm. The graft base on which the graft polymer is based was prepared in the direct growth process. The gel content of the graft polymer, measured in acetone, is 80 wt. %.

Component B1-2

Graft polymer of the ABS type prepared in the emulsion polymerization process using a redox system of tert-butyl hydroperoxide and sodium ascorbate as the initiator of the grafting reaction, having an A:B:S ratio of 12:58:30 wt. %, in which 0 wt. % of the grafted particles have a grafted particle diameter, determined by ultracentrifugation, of less than 100 nm and 0 wt. % of the grafted particles have a grafted particle diameter, determined by ultracentrifugation, of greater than 800 nm. The graft base on which the graft polymer is based was prepared in the direct growth process. The gel content of the graft polymer, measured in acetone, is 90 wt. %.

Component B1-3

Graft polymer of the ABS type prepared in the emulsion polymerization process with potassium peroxodisulfate (KPS) as the initiator of the free radical grafting reaction, having an A:B:S ratio of 12:50:38 wt. %, in which 40 wt. % of the grafted particles have a grafted particle diameter, determined by ultracentrifugation, of less than 100 nm and 0 wt. % of the grafted particles have a grafted particle diameter, determined by ultracentrifugation, of greater than 800 nm. The graft base on which the graft polymer is based was prepared in the agglomeration process. The gel content of the graft polymer, measured in acetone, is 90 wt. %.

Component B1-4

Graft polymer of the ABS type prepared in the emulsion polymerization process with potassium peroxodisulfate (KPS) as the initiator of the free radical grafting reaction, having an A:B:S ratio of 9:66:25 wt. %, in which 40 wt. % of the grafted particles have a grafted particle diameter, determined by ultracentrifugation, of less than 100 nm and 15 wt. % of the grafted particles have a grafted particle diameter, determined by ultracentrifugation, of greater than 800 nm. The graft base on which the graft polymer is based was prepared in the agglomeration process. The gel content of the graft polymer, measured in acetone, is 93 wt. %.

Component B1-5

Graft polymer of the ABS type prepared in the emulsion polymerization process with potassium peroxodisulfate (KPS) as the initiator of the free radical grafting reaction, having an A:B:S ratio of 11:60:29 wt. %, in which 10 wt. % of the grafted particles have a grafted particle diameter, determined by ultracentrifugation, of less than 100 nm and 10 wt. % of the grafted particles have a grafted particle diameter, determined by ultracentrifugation, of greater than 800 nm. The graft base on which the graft polymer is based was prepared in the agglomeration process. The gel content of the graft polymer, measured in acetone, is 91 wt. %.

Component B1-6

Graft polymer of the ABS type prepared in the emulsion polymerization process with potassium peroxodisulfate (KPS) as the initiator of the free radical grafting reaction, having, an A:B:S ratio of 13:54:33 wt. %, in which 0 wt. % of the grafted particles have a grafted particle diameter, determined by ultracentrifugation, of less than 100 nm and 10 wt. % of the grafted particles have a grafted particle diameter, determined by ultracentrifugation, of greater than 800 nm. The graft base on which the graft polymer is based was prepared in the agglomeration process. The gel content of the graft polymer, measured in acetone, is 80 wt. %.

Component B1-7

Graft polymer of the ABS type prepared in the emulsion polymerization process with potassium peroxodisulfate (KPS) as the initiator of the free radical grafting reaction, having an A:B:S ratio of 14:43:43 wt. %, in which 10 wt. % of the grafted particles have a grafted particle diameter, determined by ultracentrifugation, of less than 100 nm and 5 wt. % of the grafted particles have a grafted particle diameter, determined by ultracentrifugation, of greater than 800 nm. The graft base on which the graft polymer is based was prepared in the agglomeration process. The gel content of the graft polymer, measured in acetone, is 66 wt. %.

Component B1-8

Graft polymer of the MB type prepared in the emulsion polymerization process with potassium peroxodisulfate (KPS) as the initiator of the free radical grafting reaction, having a polybutadiene rubber content of 78 wt. % and having a PMMA grafted shell of 22 wt. %, in which 0 wt. % of the grafted particles have a grafted particle diameter, determined by ultracentrifugation, of less than 100 nm and 0 wt. % of the grafted particles have a grafted particle diameter, determined by ultracentrifugation, of greater than 800 nm. The graft base on which the graft polymer is based was prepared in the direct growth process. The gel content of the graft polymer, measured in acetone, is 94 wt. %.

Component B1-9

Graft polymer of the ABS type prepared in the emulsion polymerization process with potassium peroxodisulfate (KPS) as the initiator of the free radical grafting reaction, having an A:B:S ratio of 12:54:34 wt. %, in which 10 wt. % of the grafted particles have a grafted particle diameter, determined by ultracentrifugation, of less than 100 nm and 0 wt. % of the grafted particles have a grafted particle diameter, determined by ultracentrifugation, of greater than 800 nm. The graft base on which the graft polymer is based was prepared in the direct growth process. The gel content of the graft polymer, measured in acetone, is 85 wt. %.

The characteristics of components B1-1 to B1-9 are summarized in Table 1 as an overview.

TABLE 1

| | | Characteristics of the emulsion graft polymers B1 | | | | |
|---|---|---|---|---|---|---|
| E graft polymer B1 | Content < 100 nm [wt. %] | Content > 800 nm [wt. %] | Initiation | Bd content [wt. %] | Gel content [wt. %] | Rubber base |
| B1-1 | 6 | 0 | KPS | 49 | 80 | direct growth |
| B1-2 | 0 | 0 | redox | 58 | 90 | direct growth |
| B1-3 | 40 | 0 | KPS | 50 | 90 | agglomeration |
| B1-4 | 40 | 15 | KPS | 66 | 93 | agglomeration |
| B1-5 | 10 | 10 | KPS | 60 | 91 | agglomeration |

TABLE 1-continued

Characteristics of the emulsion graft polymers B1

| E graft polymer B1 | Content < 100 nm [wt. %] | Content > 800 nm [wt. %] | Initiation | Bd content [wt. %] | Gel content [wt. %] | Rubber base |
|---|---|---|---|---|---|---|
| B1-6 | 0 | 10 | KPS | 54 | 80 | agglomeration |
| B1-7 | 10 | 5 | KPS | 43 | 66 | agglomeration |
| B1-8 | 0 | 0 | KPS | 78 | 94 | direct growth |
| B1-9 | 10 | 0 | KPS | 54 | 85 | direct growth |

Component B2-1 n-Butyl acrylate-modified graft polymer of the ABS type prepared in the bulk polymerization process having an A:B:S ratio of 21:10:65 wt. % and having an n-butyl acrylate content of 4 wt. %, in which 0 wt. % of the grafted particles have a grafted particle diameter, determined by ultracentrifugation, of less than 100 nm and 15 wt. % of the grafted particles have a grafted particle diameter, determined by ultracentrifugation, of greater than 800 nm. The D50 value of the grafted particle diameter, determined by ultracentrifugation, is 0.5 μm. The graft base on which the graft polymer is based is a styrene/butadiene block copolymer rubber (SBR). The gel content of the graft polymer, measured in acetone, is 20 wt. %. The weight-average molecular weight $M_w$, measured by GPC with polystyrene as the standard in methylene chloride at 20° C., of the free, i.e. not bonded chemically to the rubber or included in the rubber particles in a form insoluble for acetone, n-butyl acrylate-modified SAN is 110 kg/mol.

Component B2-2

Graft polymer of the ABS type prepared in the bulk polymerization process having an A:B:S ratio of 24:11:65 wt. %, in which 0 wt. % of the grafted particles have a grafted particle diameter, determined by ultracentrifugation, of less than 100 nm and 50 wt. % of the grafted particles have a grafted particle diameter, determined by ultracentrifugation, of greater than 800 nm. The D50 value of the grafted particle diameter, determined by ultracentrifugation, is 0.8 μm. The graft base on which the graft polymer is based is a pure polybutadiene rubber. The gel content of the graft polymer, measured in acetone, is 22 wt. %. The weight-average molecular weight $M_w$, measured by GPC with polystyrene as the standard in methylene chloride at 20° C., of the free, i.e. not bonded chemically to the rubber or included in the rubber particles in a form insoluble for acetone, SAN is 150 kg/mol.

The characteristics of components B2-1 and B2-2 are summarized in Table 2 as an overview.

Component C2

Phosphorous acid ester of bis-(2-hydroxy-3-cyclohexyl-5-methylphenyl)-methane with the formula

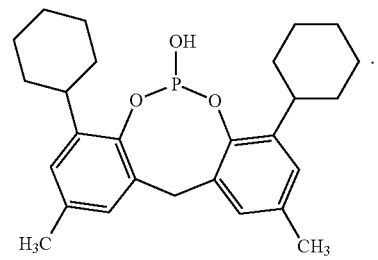

Component C3

Heat stabilizer, Irganox 1076, BASF (Ludwigshafen, Germany)

Component C4

Carbon black pigment, Black Pearls 800, Cabot Corp. (Leuven, Belgium)

Production of the Test Specimens and Testing

The components were mixed on a twin-screw extruder ZSK25 from Coperion Werner & Pfleiderer at a melt temperature of 260° C. and with application of a reduced pressure of 100 mbar (absolute).

The granules resulting from the particular compounding were processed to test specimens on an injection moulding machine (Arburg) at melt temperatures of 260° C., 300° C. and 320° C. and a mould temperature of 80° C.

The gloss is measured in reflection at a measuring angle of 20° in accordance with DIN 67530 on small sheets of dimensions 60 mm×40 mm×2 mm, which were produced at a melt temperature of 260° C. or 320° C. in injection moulding using a mould having a highly polished surface.

TABLE 2

Characteristics of the emulsion graft polymers B2

| M graft polymer B2 | Content < 100 nm [wt. %] | Content > 800 nm [wt. %] | D50 [μm] | Bd content [wt. %] | Rubber type | Gel content [wt. %] | $M_w$ (SAN) [kg/mol] |
|---|---|---|---|---|---|---|---|
| B2-1 | 0 | 15 | 0.5 | 10 | SBR | 20 | 110 |
| B2-2 | 0 | 50 | 0.8 | 11 | PBd | 22 | 150 |

Component B3

Styrene/acrylonitrile copolymer having a styrene/acrylonitrile ratio of 76:24 wt. % and a weight-average molecular weight $M_w$, measured by GPC with polystyrene as the standard in dimethylformamide at 20° C., of 100 kg/mol.

Component C1

Pentaerythritol tetrastearate as a lubricant/mould release agent

The relative change in the gloss measured in this way resulting from increasing the melt temperature in the injection moulding from 260° C. to 320° C. serves as a measure of the processing stability of the gloss and is calculated according to:

change in gloss (260° C.→320° C.)=100%∗(gloss at 320° C.−gloss at 260° C.)/gloss at 260° C.

The resistance to stress cracking under the influence of media (environmental stress cracking=ESC) is determined in accordance with ISO 4599 on test bars of dimensions 80 mm×10 mm×4 mm, which were produced in injection moulding at a melt temperature of 260° C. In this context, the time to fracture failure of the test specimens, which were loaded with an external edge fibre elongation of 2.4% by means of a clamping template and immersed completely in rape oil as the medium, serves as a measure of the resistance to stress cracking The behaviour in the multiaxial impact penetration test serves as a measure of the low temperature ductility in the impact/crash test of practical relevance. The impact penetration test is carried out at −30° C. in accordance with ISO 6603-2 on test specimens of dimensions 60 mm×60 mm×2 mm which have been produced in injection moulding at a melt temperature of 260° C. and—for simulation of intensified processing conditions—at 300° C. In this context, the fracture patterns of ten test specimens in total were evaluated as to whether a splintering fracture failure occurred, i.e. whether parts of the test specimen were broken out or stamped out completely from the test specimen.

The heat distortion temperature of the moulding compositions is evaluated with the aid of the Vicat B120 value measured in accordance with ISO 306 on test bars of dimensions 80 mm×10 mm×4 mm, which were produced in injection moulding at a melt temperature of 260° C.

The melt fluidity under injection moulding conditions is evaluated with the aid of the melt viscosity measured in accordance with ISO 11443 at a temperature of 260° C. and a shear gradient of 1,000 s-1.

As evidence of the extent to which the compositions prepared are suitable for the production of components having both high gloss and high matt component sections in a single injection moulding step, sheets were produced in injection moulding at a melt temperature of 270° C. and with a mould temperature of 80° C., and were highly polished on one side and had on the other side a Daimler Benz Fine Texture 35 (decor MBN 31030 000035) with additional etching of the Micromatt Stipple type. The gloss was determined on both sides in accordance with DIN 67530 in each case at a measuring angle of 60° in reflection. The aim here was to realize a surface gloss of at least 99 on the high gloss side in the component and a surface gloss of max. 1.2 on the side with surface texture.

The examples and comparative examples are to be found in Tables 3 to 8.

The examples in Table 3 show the influence of the variation in the emulsion graft polymer according to component B1 at a comparable total rubber content and the same bulk ABS type and bulk ABS content of the polycarbonate composition. They show that those Examples 1 to 6 according to the invention having a content, based on the total composition, of rubber-based grafted particles from components B1 and B2 having a grafted particle diameter, measured by ultracentrifugation, below 100 nm or above 800 nm of in each case in total less than 1.5 wt. %, the emulsion graft polymer according to component B1 having been produced with potassium peroxodisulfate as the initiator of the free radical grafting reaction, have the profile of properties according to the invention comprising processing-stable gloss over a wide range of processing temperatures and low temperature ductility and high resistance to stress cracking and are suitable for the production of components having both high matt and high gloss component sections in a single injection moulding step. Comparative Example C1, which indeed meets the conditions with respect to the grafted particle diameter, but in which an emulsion graft polymer according to component B1 which was prepared using a redox system of tert-butyl hydroperoxide and sodium ascorbate as the initiator of the grafting reaction is employed, does not meet the requirement of a gloss which is stable over a wide range of processing temperatures. Comparative Example C2, in which in turn an emulsion graft polymer according to component B1 which was prepared using potassium peroxodisulfate as the initiator of the free radical grafting reaction is indeed employed, the grafted particles of which, however, have too high a fine content, likewise does not show a gloss which is stable over a wide range of processing temperatures. Comparative Example C3 behaves similarly.

TABLE 3

Examples - Variation of the emulsion graft polymer B1

| | 1 | C1 | C2 | C3 | 2 | 3 | 4 | 5 | 6 |
|---|---|---|---|---|---|---|---|---|---|
| Composition | | | | | | | | | |
| A3 | 59.35 | 59.35 | 59.35 | 59.35 | 59.35 | 59.35 | 59.35 | 59.35 | 59.35 |
| B1-1 | 13.25 | | | | | | | | |
| B1-2 | | 13.25 | | | | | | | |
| B1-3 | | | 14.27 | | | | | | |
| B1-4 | | | | 11.24 | | | | | |
| B1-5 | | | | | 12.37 | | | | |
| B1-6 | | | | | | 13.74 | | | |
| B1-7 | | | | | | | 16.49 | | |
| B1-8 | | | | | | | | 9.51 | |
| B1-9 | | | | | | | | | 13.25 |
| B2-1 | 8.90 | 8.90 | 8.90 | 8.90 | 8.90 | 8.90 | 8.90 | 8.90 | 8.90 |
| B3 | 17.44 | 17.44 | 16.42 | 19.45 | 18.32 | 16.95 | 14.20 | 21.18 | 17.44 |
| C1 | 0.74 | 0.74 | 0.74 | 0.74 | 0.74 | 0.74 | 0.74 | 0.74 | 0.74 |
| C2 | 0.12 | 0.12 | 0.12 | 0.12 | 0.12 | 0.12 | 0.12 | 0.12 | 0.12 |
| C3 | 0.20 | 0.20 | 0.20 | 0.20 | 0.20 | 0.20 | 0.20 | 0.20 | 0.20 |
| C4 | 0.50 | 0.50 | 0.50 | 0.50 | 0.50 | 0.50 | 0.50 | 0.50 | 0.50 |
| PBd content based on A-C [wt. %] | 7.4 | 8.6 | 8.0 | 8.3 | 8.3 | 8.3 | 8.0 | 8.3 | 8.0 |
| Content of grafted particles >800 nm based on A-C [wt. %] | 0.3 | 0.3 | 0.3 | 1.8 | 1.4 | 1.4 | 0.8 | 0.3 | 0.3 |
| Content of grafted particles <100 nm based on A-C [wt. %] | 0.6 | 0.0 | 5.1 | 4.2 | 1.1 | 0.0 | 1.1 | 0.0 | 1.1 |
| Properties | | | | | | | | | |
| Gloss FMPL @ 260° C. (20°) | 97 | 94 | 84 | 96 | 98 | 97 | 95 | 100 | 97 |
| Gloss FMPL @ 320° C. (20°) | 97 | 76 | 45 | 90 | 95 | 97 | 98 | 100 | 99 |
| Change in gloss FMPL 260-->320° C. (20°) | 0% | −19% | −46% | −6% | −3% | 0% | 3% | 0% | 2% |

TABLE 3-continued

Examples - Variation of the emulsion graft polymer B1

|  | 1 | C1 | C2 | C3 | 2 | 3 | 4 | 5 | 6 |
|---|---|---|---|---|---|---|---|---|---|
| Gloss polished surface @ 270° C. (60°) | 100 | 100 | 100 | 100 | 100 | 100 | 99 | 100 | 99 |
| Gloss grained surface @ 270° C. (60°) | 1.2 | 1.1 | 1.2 | 1.2 | 1.2 | 1.2 | 1.1 | 1.2 | 1.2 |
| Melt viscosity (260° C./1,000 s$^{-1}$) [Pas] | 213 | 216 | 236 | 220 | 218 | 215 | 210 | 202 | 205 |
| ESC (time to fracture) [h] | 10 | 16 | 14 | 10 | 23 | 29 | 31 | 4 | 14 |
| Impact penetration evaluation (−30° C./260° C.) - splintering fracture pattern | no | no | no | no | no | no | no | no | no |
| Impact penetration evaluation (−30° C./300° C.) - splintering fracture pattern | no | no | no | no | no | no | no | no | no |
| Vicat B120 [° C.] | 119 | 120 | 119 | 120 | 120 | 118 | 118 | 120 | 119 |

The examples in Table 4 show the influence of the bulk graft polymer according to component B2. In Comparative Example C4 a typical bulk ABS having, compared with conventional emulsion graft polymers, a high content of coarse-particled grafted particles and therefore also a high D50 value is employed, such as is also disclosed in the state of the art. The comparative example shows, compared with the corresponding Example 6 according to the invention, a comparatively low gloss at moderate processing temperatures and an undesirably high variability of the gloss as a function of the processing temperature.

TABLE 4

Examples - Variation of the bulk polymer B2

|  | 6 | C4 |
|---|---|---|
| Composition |  |  |
| A3 | 59.35 | 59.35 |
| B1-9 | 13.25 | 13.25 |
| B2-1 | 8.90 |  |
| B2-2 |  | 8.90 |
| B3 | 17.44 | 17.44 |
| C1 | 0.74 | 0.74 |
| C2 | 0.12 | 0.12 |
| C3 | 0.20 | 0.2 |
| C4 | 0.50 | 0.5 |
| PBd content based on A-C [wt. %] | 8.0 | 8.1 |
| Content of grafted particles >800 nm based on A-C [wt. %] | 0.3 | 1.0 |
| Content of grafted particles <100 nm based on A-C [wt. %] | 1.1 | 1.1 |
| Properties |  |  |
| Gloss FMPL @ 260° C. (20°) | 97 | 90 |
| Gloss FMPL @ 320° C. (20°) | 99 | 99 |
| Change in gloss FMPL 260-->320° C. (20°) | 2% | 10% |
| Gloss polished surface @ 270° C. (60°) | 99 | 100 |
| Gloss grained surface @ 270° C. (60°) | 1.2 | 1.1 |
| Melt viscosity (260° C./1,000 s$^{-1}$) [Pas] | 205 | 221 |
| ESC (time to fracture) [h] | 14 | 14 |
| Impact penetration evaluation (−30° C./260° C.) - splintering fracture pattern | no | no |
| Impact penetration evaluation (−30° C./300° C.) - splintering fracture pattern | no | no |
| Vicat B120 [° C.] | 119 | 121 |

The examples in Table 5 show the influence of the polycarbonate molecular weight. Comparative Example C5, which was prepared employing a polycarbonate raw material of too low molecular weight, shows an inadequate gloss stability on variation of the processing temperature and a lack of low temperature ductility at elevated processing temperatures. Such a composition moreover has a lack of resistance to stress cracking under the influence of chemicals. On the other hand, Comparative Example C6, which was prepared employing a polycarbonate raw material of too high molecular weight, shows an overall lack of gloss on polished mould surfaces.

TABLE 5

Examples - Variation of the polycarbonate molecular weight

|  | C5 | 7 | C6 |
|---|---|---|---|
| Composition |  |  |  |
| A1 | 59.35 |  |  |
| A3 |  | 59.35 |  |
| A4 |  |  | 59.35 |
| B1-9 | 15.00 | 15.00 | 15.00 |
| B2-1 | 8.90 | 8.90 | 8.90 |
| B3 | 15.69 | 15.69 | 15.69 |
| C1 | 0.74 | 0.74 | 0.74 |
| C2 | 0.12 | 0.12 | 0.12 |
| C3 | 0.20 | 0.2 | 0.2 |
| C4 | 0.50 | 0.5 | 0.5 |
| PBd content based on A-C [wt. %] | 9.0 | 9.0 | 9.0 |
| Content of grafted particles >800 nm based on A-C [wt. %] | 0.3 | 0.3 | 0.3 |
| Content of grafted particles <100 nm based on A-C [wt. %] | 1.3 | 1.3 | 1.3 |
| Properties |  |  |  |
| Gloss FMPL @ 260° C. (20°) | 97 | 99 | 93 |
| Gloss FMPL @ 320° C. (20°) | 88 | 100 | 95 |
| Change in gloss FMPL 260-->320° C. (20°) | 9% | −1% | −2% |
| Gloss polished surface @ 270° C. (60°) | 100 | 100 | 99 |
| Gloss grained surface @ 270° C. (60°) | 1.1 | 1.1 | 1.1 |
| Melt viscosity (260° C./1,000 s$^{-1}$) [Pas] | 179 | 213 | 222 |
| ESC (time to fracture) [h] | 1 | 15 | 27 |
| Impact penetration evaluation (−30° C./260° C.) - splintering fracture pattern | no | no | no |
| Impact penetration evaluation (−30° C./300° C.) - splintering fracture pattern | yes | no | no |
| Vicat B120 [° C.] | 121 | 119 | 118 |

The examples in Table 6 show the influence of the ratio of the amount of emulsion graft polymer (B1) to the amount of bulk graft polymer (B2) at a constant total amount of rubber. In the range investigated, which extends from 12 to 76 wt. %, based on the sum of B1 and B2, of bulk graft polymer B2, all the examples according to the invention (6 and 8 to 10) which have been prepared with a combination of emulsion and bulk graft polymer have the profile of properties sought independently of the ratio of these two components. On the other hand, Comparative Example C9, which is based on pure emulsion graft polymer, i.e. comprises no bulk graft polymer B2, has a lack of resistance to stress cracking under the influence of chemicals.

TABLE 6

Examples - Variation of the emulsion ABS/bulk ABS ratio

|  | 8 | 9 | 6 | 10 | C9 |
|---|---|---|---|---|---|
| Composition |  |  |  |  |  |
| A3 | 59.35 | 59.35 | 59.35 | 59.35 | 59.35 |
| B1-9 | 9.46 | 11.66 | 13.25 | 14.48 | 14.84 |
| B2-1 | 30.13 | 17.80 | 8.90 | 2.00 |  |
| B3 |  | 10.13 | 17.44 | 23.11 | 24.75 |
| C1 | 0.74 | 0.74 | 0.74 | 0.74 | 0.74 |
| C2 | 0.12 | 0.12 | 0.12 | 0.12 | 0.12 |
| C3 | 0.20 | 0.20 | 0.20 | 0.20 | 0.20 |
| C4 | 0.50 | 0.50 | 0.50 | 0.50 | 0.50 |
| PBd content based on A-C [wt. %] | 8.1 | 8.1 | 8.0 | 8.0 | 8.0 |
| Content of grafted particles >800 nm based on A-C [wt. %] | 0.9 | 0.5 | 0.3 | 0.1 | 0 |
| Content of grafted particles <100 nm based on A-C [wt. %] | 0.8 | 1.0 | 1.1 | 1.2 | 1.3 |
| Properties |  |  |  |  |  |
| Gloss FMPL @ 260° C. (20°) | 97 | 98 | 97 | 99 | 100 |
| Gloss FMPL @ 320° C. (20°) | 100 | 100 | 99 | 99 | 100 |
| Change in gloss FMPL 260->320° C. (20°) | 3% | 2% | 2% | 0% | 0% |
| Gloss polished surface @ 270° C. (60°) | 99 | 99 | 99 | 100 | 100 |
| Gloss grained surface @ 270° C. (60°) | 1.0 | 1.0 | 1.2 | 1.1 | 1.1 |
| Melt viscosity (260° C./1,000 s$^{-1}$) [Pas] | 193 | 199 | 205 | 205 | 270 |
| ESC (time to fracture) [h] | 25 | 19 | 14 | 19 | 4 |
| Impact penetration evaluation (−30° C./260° C.) - splintering fracture pattern | no | no | no | no | no |
| Impact penetration evaluation (−30° C./300° C.) - splintering fracture pattern | no | no | no | no | no |
| Vicat B120 [° C.] | 115 | 117 | 119 | 120 | 120 |

The examples in Table 7 show the influence of the polycarbonate:ABS ratio. Comparative Example 7 with too low a polycarbonate content leads to a lack of gloss on highly polished mould surfaces and shows a lack of low temperature ductility at elevated processing temperatures and resistance to stress cracking under the influence of chemicals. On the other hand, Comparative Example 8, with too high a polycarbonate content, shows too high a melt viscosity and inasmuch leads to a lack of reproduction of the mould surface texture on grained surfaces and therefore to too high a gloss with a "greasy"-looking surface finish.

TABLE 7

Examples - Variation of the PC:ABS ratio

|  | 6 | C7 | C8 |
|---|---|---|---|
| Composition |  |  |  |
| A3 | 59.35 | 40.00 | 80.00 |
| B1-9 | 13.25 | 19.73 | 6.34 |
| B2-1 | 8.90 | 13.25 | 4.26 |
| B3 | 17.44 | 25.96 | 8.34 |
| C1 | 0.74 | 0.74 | 0.74 |
| C2 | 0.12 | 0.12 | 0.12 |
| C3 | 0.20 | 0.20 | 0.20 |
| C4 | 0.50 | 0.50 | 0.50 |
| PBd content based on A-C [wt. %] | 8.0 | 12.0 | 3.9 |
| Content of grafted particles >800 nm based on A-C [wt. %] | 0.3 | 0.4 | 0.1 |
| Content of grafted particles <100 nm based on A-C [wt. %] | 1.1 | 1.7 | 0.5 |
| Properties |  |  |  |
| Gloss FMPL @ 260° C. (20°) | 97 | 92 | 100 |
| Gloss FMPL @ 320° C. (20°) | 99 | 94 | 100 |
| Change in gloss FMPL 260-->320° C. (20°) | 2% | 2% | 0% |
| Gloss polished surface @ 270° C. (60°) | 99 | 98 | 100 |
| Gloss grained surface @ 270° C. (60°) | 1.2 | 1.0 | 1.5 |
| Melt viscosity (260° C./1,000 s$^{-1}$) [Pas] | 205 | 163 | 316 |
| ESC (time to fracture) [h] | 14 | 8 | 22 |
| Impact penetration evaluation (−30° C./260° C.) - splintering fracture pattern | no | no | no |
| Impact penetration evaluation (−30° C./300° C.) - splintering fracture pattern | no | yes | no |
| Vicat B120 [° C.] | 119 | 108 | 138 |

FMPL: colour sample plates

The examples in Table 8 show the influence of the rubber content, which was realized here via an increase in the content of emulsion graft polymer according to component B1 at a constant concentration of the bulk graft polymer according to component B2, i.e. at the expense of the rubber-free vinyl copolymer according to component B3. Comparative Example C10, with too low a rubber content, has a lack of low temperature ductility and resistance to stress cracking under the influence of chemicals. Comparative Example C11, having too high a content of grafted particles from components B1 and B2 having a grafted particle diameter, measured by ultracentrifugation, of less than 100 nm has a lack of melt fluidity and, with a lack of gloss at moderate processing temperatures, also shows too high a dependency of the gloss achieved on highly polished mould surfaces on the processing temperature.

TABLE 8

Examples - Variation of the rubber content

|  | C10 | 11 | 6 | 12 | C11 |
|---|---|---|---|---|---|
| Composition |  |  |  |  |  |
| A3 | 59.35 | 59.35 | 59.35 | 59.35 | 59.35 |
| B1-9 | 3.00 | 9.00 | 13.25 | 15.00 | 26.69 |
| B2-1 | 8.90 | 8.90 | 8.90 | 8.90 | 8.90 |
| B3 | 27.69 | 21.69 | 17.44 | 15.69 | 4.00 |
| C1 | 0.74 | 0.74 | 0.74 | 0.74 | 0.74 |
| C2 | 0.12 | 0.12 | 0.12 | 0.12 | 0.12 |
| C3 | 0.20 | 0.20 | 0.20 | 0.20 | 0.20 |
| C4 | 0.50 | 0.50 | 0.50 | 0.50 | 0.50 |
| PBd content based on A-C [wt. %] | 2.5 | 4.3 | 8.0 | 9.0 | 15.3 |
| Content of grafted particles >800 nm based on A-C [wt. %] | 0.3 | 0.3 | 0.3 | 0.3 | 0.3 |
| Content of grafted particles <100 nm based on A-C [wt. %] | 0.3 | 0.8 | 1.1 | 1.3 | 2.3 |
| Properties |  |  |  |  |  |
| Gloss FMPL @ 260° C. (20°) | 100 | 99 | 97 | 99 | 94 |
| Gloss FMPL @ 320° C. (20°) | 98 | 100 | 99 | 100 | 99 |
| Change in gloss FMPL 260->320° C. (20°) | -2% | 1% | 2% | 1% | 5% |
| Gloss polished surface @ 270° C. (60°) | 100 | 100 | 99 | 100 | 99 |
| Gloss grained surface @ 270° C. (60°) | 1.3 | 1.2 | 1.2 | 1.1 | 0.9 |
| Melt viscosity (260° C./1,000 s$^{-1}$) [Pas] | 168 | 191 | 205 | 213 | 296 |
| ESC (time to fracture) [h] | 7 | 9 | 14 | 15 | 29 |
| Impact penetration evaluation (-30° C./260° C.) - splintering fracture pattern | yes | no | no | no | no |
| Impact penetration evaluation (-30° C./300° C.) - splintering fracture pattern | yes | no | no | no | no |
| Vicat B120 [° C.] | 118 | 118 | 119 | 119 | 120 |

The invention claimed is:

1. A polymer composition comprising:
A) from 45 to 95 parts by wt., based on the sum of A and B, wherein the parts by weight of A and B add up to 100, of aromatic polycarbonate and/or polyester carbonate,
B) from 5 to 55 parts by wt., based on the sum of A and B, of a mixture comprising:
   B1) at least one graft polymer prepared by an emulsion polymerization process,
   B2) at least one graft polymer prepared by a bulk, suspension and/or solution polymerization process,
   B3) optionally a rubber-free vinyl (co)polymer,
   wherein said graft polymers B1 and B2 are both based on butadiene-containing elastomeric graft bases B1.2 and B2.2 and in which the total content of butadiene from the graft bases B1.2 and B2.2, based on the total composition, is from 5 to 12 wt. %, and
C) from 0 to 30 parts by wt., based on the sum of A and B, of at least one commercially available polymer additive,
wherein
(i) the composition comprises not more than 2.0 wt. % of grafted particles from components B1 and B2 having an associated grafted particle diameter of at least 800 nm, and comprises not more than 2.0 wt. % of grafted particles from components B1 and B2 having an associated grafted particle diameter of at most 100 nm, and
(ii) the graft polymer according to component B1 is prepared by grafting a mixture (B1.1) of vinylic compounds on to a particulate rubber-elastic graft base (B1.2), wherein said grafting is started using an inorganic persulfate compound as a polymerization initiator, and
(iii) the composition is free from graft polymers prepared by an emulsion polymerization process which have been prepared using a redox-based polymerization initiator system.

2. The composition according to claim 1, wherein:
(i) the composition comprises not more than 1.5 wt. % of grafted particles from components B1 and B2 having an associated grafted particle diameter of at least 800 nm, and comprises not more than 1.5 wt. % of grafted particles from components B1 and B2 having an associated grafted particle diameter of at most 100 nm.

3. The composition according to claim 1, comprising from 55 to 75 parts by wt., based on the sum of A and B, of aromatic polycarbonate and/or polyester carbonate.

4. The composition according to claim 1, comprising:
A) from 55 to 75 parts by wt., based on the sum of A and B, of aromatic polycarbonate and/or polyester carbonate,
B) from 25 to 45 parts by wt., based on the sum of A and B, of a mixture comprising:
   B1) at least one graft polymer prepared by an emulsion polymerization process,
   B2) at least one graft polymer prepared in a bulk, suspension and/or solution polymerization process,
   B3) optionally a rubber-free vinyl (co)polymer, and
C) from 0.3 to 7 parts by wt., based on the sum of A and B, of at least one polymer additive.

5. The composition according to claim 1, wherein the aromatic polycarbonate and/or polyester carbonate according to component A has a weight-average molecular weight $M_w$, measured by GPC in methylene chloride at 25° C. using a polycarbonate standard, of from 26,000 to 31,000 g/mol.

6. The composition according to claim 1, wherein said graft polymer B2 is present in a content of from 10 to 45 parts by wt., based on the sum of B1 and B2.

7. The composition according to claim 1, wherein said component B1 is a graft polymer, prepared by an emulsion polymerization process, of B1.1) from 20 to 60 wt. %, based on component B1, of a mixture of B1.1.1) from 70 to 80 wt. %, based on B1.1, of at least one monomer selected from the group consisting of vinylaromatics, vinylaromatics substituted on the nucleus, and (meth)acrylic acid (C1-C8)-alkyl esters; and B1.1.2) from 20 to 30 wt. %, based on B1.1, of at least one monomer selected from the group consisting of vinyl cyanides, (meth)acrylic acid (C1-C8)-alkyl esters, and derivatives of unsaturated carboxylic acids, on B1.2) from 80 to 40 wt. %, based on component B1, of at least one elastomeric graft base having a glass transition temperature of <−60° C., and wherein said component B2 is a graft polymer, prepared by a bulk, solution and/or suspension polymerization process, of B2.1) from 87 to 93 wt. %, based on component B2, of a mixture of B2.1.1) from 70 to 80 wt. %, based on said mixture B.2.1, of at least one monomer selected from the group of vinylaromatics, vinylaromatics substituted on the nucleus and (meth)acrylic acid (C1-C8)-alkyl esters, and B2.1.2) from 20 to 30 wt. %, based on said mixture B.2.1, of at least one monomer selected from the group consisting of vinyl cyanides, (meth)acrylic acid (C1-C8)-alkyl esters, and derivatives of unsaturated carboxylic acids, on B2.2) from 13 to 7 wt. %, based on said componenet B2, of at least one graft base comprising a glass transition temperature of <−60° C.

8. The composition according to claim 1, wherein the grafted particles in said graft polymer B1 prepared by an emulsion polymerization process have an average particle size (D50 value) of from 0.2 to 0.5 um.

9. The composition according to claim 1, wherein the grafted particles in said graft polymer B2 prepared by a bulk, solution and/or suspension polymerization process have an average particle size (D50 value) of from 0.3 to 0.6 um.

10. The composition according to claim 1, wherein said graft polymer B2 prepared by a bulk, solution and/or suspension polymerization process is based on a styrene/butadiene block copolymer rubber and/or a mixture of styrene/butadiene block copolymer rubber with pure polybutadiene rubber as the graft base B2.2, has a gel content of from 17 to 23 wt. %, measured in acetone, and comprises free copolymer from B2.1.1 and B2.1.2 having a weight-average molecular weight Mw, determined in tetrahydrofuran by gel permeation chromatography with polystyrene as the standard, of from 80,000 to 120,000 g/mol.

11. The composition according to claim 1, wherein component (c) is present and comprises at least one polymer additive selected from the group consisting of flameproofing agents, flameproofing synergists, smoke-suppressing additives, antidripping agents, internal and external lubricants and mould release agents, flowability auxiliary agents, antistatics, conductivity additives, UV/light stabilizers, heat stabilizers, antioxidants, transesterification inhibitors, agents which prevent hydrolysis, antibacterially acting additives, additives which improve scratch resistance, IR absorbents, optical brighteners, fluorescent additives, fillers and reinforcing substances, acids and dyestuffs and pigments.

12. The composition according to claim 1, wherein component (c) is present and comprises at least one phosphorus-containing flameproofing agent selected from the group consisting of mono- and oligomeric phosphoric and phosphonic acid esters, phosphonatamines and phosphazenes.

13. A shaped body and/or moulding comprising a composition according to claim 1, which is produced in a single production step in an injection moulding process without a further surface after-treatment step, and which comprises one or more high gloss component sections having a gloss, determined in reflection in accordance with DIN 67530 at a measuring angle of 60°, of at least 98 and one or more deep matte component sections having a gloss, determined in reflection in accordance with DIN 67530 at a measuring angle of 60°, of at most 2.

14. The shaped body and/or moulding according to claim 13, which have been produced in a single production step in an injection moulding process without a further surface after-treatment step and which have one or more high gloss component sections having a gloss, determined in reflection in accordance with DIN 67530 at a measuring angle of 60°, of at least 99, and one or more deep matte component sections having a gloss, determined in reflection in accordance with DIN 67530 at a measuring angle of 60°, of at most 1.2.

15. The composition according to claim 1, wherein component C) is present.

16. The composition according to claim 1, wherein B1) comprises an ABS graft polymer and B2 comprises an ABS graft polymer.

* * * * *